United States Patent [19]

Sekihata et al.

[11] Patent Number: 5,682,381
[45] Date of Patent: Oct. 28, 1997

[54] WIRELESS LAN SYSTEM

[75] Inventors: Osamu Sekihata; Hironobu Michiya; Kiyotaka Shikata, all of Kawasaki, Japan

[73] Assignee: Fujitsu Limited, Kanagawa, Japan

[21] Appl. No.: 529,278

[22] Filed: Sep. 15, 1995

[30] Foreign Application Priority Data

Dec. 27, 1994 [JP] Japan .................. 6-324840

[51] Int. Cl.$^6$ .................................. H04B 7/065
[52] U.S. Cl. ................ 370/332; 370/338; 370/445; 455/541; 455/226.2; 379/58
[58] Field of Search ................ 370/95.1, 95.3, 370/100.1, 105.1, 79, 82, 85.1, 85.2, 85.3, 338, 332, 445, 331, 431; 375/269, 347; 379/58, 59, 60, 63; 455/52.1, 53.1, 54.1, 56.1, 7, 10, 11.1, 14, 18, 13.4, 33.4, 34.1, 33.1, 33.2, 226.2

[56] References Cited

U.S. PATENT DOCUMENTS

| | | | |
|---|---|---|---|
| 5,220,564 | 6/1993 | Tuch et al. | 370/338 |
| 5,239,666 | 8/1993 | Truby | 455/18 |
| 5,309,503 | 5/1994 | Bruckert et al. | 455/33.4 |
| 5,483,551 | 1/1996 | Gang Haung et al. | 375/219 |
| 5,487,174 | 1/1996 | Persson | 455/33.2 |
| 5,515,378 | 5/1996 | Roy | 370/95.1 |

*Primary Examiner*—Alpus H. Hsu
*Assistant Examiner*—Seema S. Rao
*Attorney, Agent, or Firm*—Helfgott & Karas, P.C.

[57] ABSTRACT

A master station detects the strength of a signal received from a slave station and, on the basis of the signal strength of the receiving signal, decides a transmission timing at which frame contained in the signal is to be sent to a backbone LAN. When the transmission timing decided arrives, the master station determines whether a carrier is present on the backbone LAN. The master station discards the frame from the slave station, and therefore does not send it, if the carrier is present. If the carrier is not present on the backbone LAN, the master station sends the frame to the backbone LAN. Thus, interference between adjacent cells does not occur even when each of a number of master stations send signals to and receive signals from a slave station by using the same channel.

13 Claims, 11 Drawing Sheets

WIRELESS LAN SYSTEM

BACKGROUND OF THE INVENTION

This invention relates to a wireless LAN system and, more particularly, to a wireless LAN system having a plurality of master stations connected to a backbone LAN and slave stations, which are connected to terminals or to branch LANs, for wirelessly sending and receiving signals to and from the master stations, each of the master stations sending and receiving signals to and from the slave stations using the same channel.

Use of LANs is becoming increasingly popular at a rapid rate. A LAN allows data communication among a plurality of terminals, such as personal computers or work stations, installed at scattered locations at the same site, or between the terminals and a host computer, and allows programs and data files to be shared. Such a LAN basically is a wired LAN which connects each terminal or the host computer to basic cables (LAN cables) in the network.

When the number of terminals connected to the network in a wired LAN increases, the wiring laid within the room becomes very complicated. In a case where a terminal is portable, the advantage of portability is lost when the terminal is physically connected to the basic cable.

A wireless LAN has been proposed and is being put into practical use for the purpose of solving the aforementioned problems which arise with a wired LAN. In a wireless LAN, a backbone LAN is constructed by installing the basic cable in a ceiling or the like and installing a plurality of master stations each having a wireless device capable of transmitting signals to and receiving signals from the basic cable. Slave stations (each having a wireless device) connected to terminals communicate with one another wirelessly via the backbone LAN. In accordance with this wireless LAN, it is unnecessary to connect the slave terminals to the basic cable. This solves the wiring problems of the wired LAN and does not detract from the original features of a portable terminal.

In a wireless LAN, a cell is an area in which signals are capable of being transmitted and received by a master station. Multiple cells are arranged in such a manner that adjoining cells partially overlap each other. The reason for this is to arrange it so that communication via LAN will not be interrupted when a slave station is moved between cells while being carried about or to eliminate blank areas in which LAN communication cannot be carried out. In an area in which adjacent cells overlap, frames transmitted from a slave station within the area are received by a plurality of master stations, the master stations transmit the received frames to the backbone LAN simultaneously, frame collision occurs and frames may be lost. Though control for re-sending frames upon changing the transmission timing is performed when collision occurs, in such case identical frames are sent to the receiving party in redundant fashion.

In order to avoid the interference problem which arises when adjacent cells overlap, it is so arranged that the channel of each master station is made to differ from the channels of adjacent stations. For example, a channel is made different from adjacent channels by changing the frequency, the hopping sequence (FHSS method), the diffusion code (DSSS method), the time slot, etc.

However, the following problems arise in the multiple-channel method:

The first problem is that the system is difficult to design. The reason for this is in order to avoid interference between master stations constructing a multiple cell, which channel is to be selected from the plurality of channels possessed by the master stations must be decided upon taking into account the radio-wave environment that is peculiar to the location at which the system is installed. Designing a system that is completely free of problems in terms of system operation is very difficult. This is a problem even in systems presently being considered.

The second problem is that processing on the side of the slave station becomes very complex and the slave station takes on an elaborate construction. It is required that the slave station have the ability to deal with all of the channels possessed by the master stations and that the slave station select a channel in order to communicate with the corresponding master station. This is an operation that is necessary at the time of initial setting and when a change is made from one cell to another owing to movement of the slave station between cells. In a case where setting is made manually, a troublesome operation is required. If setting is made automatically, the channel being used by a master station is detected within the slave station and a mechanism for tuning the slave station to this channel is required on the side of the slave station. This imposes a heavy burden upon the slave station and results in a slave station that is complicated in construction and high in cost.

A third problem is that a multiple-channel scheme, in which the frequency band is not easy to adjust, is difficult to realize through a simple and inexpensive arrangement. Though millimeter waves having strong directivity are used in a wireless LAN, channel changeover in the millimeter wave band is difficult to realize through a simple and inexpensive arrangement.

SUMMARY OF THE INVENTION

Accordingly, a first object of the present invention is to arrange it so that the problem of interference between adjacent cells will not arise even when each of a number of master stations send signals to and receive signals from a slave station by using the same channel.

A second object of the present invention is to simplify the construction of a master station and slave station and to dispense with the need to set or change channels.

A third object of the present invention is to deal with movement of a slave station without the need for complicated control.

A fourth object of the present invention is to reduce traffic by selecting only frames addressed to slave stations under supervision and transmit these frames wirelessly.

In accordance with the present invention, the foregoing objects are attained by providing a wireless LAN system comprising a plurality of master stations connected to a LAN, and slave stations, connected to terminals or to branch LANs, for wirelessly sending signals to and receiving signals from the master stations, each master station sending signals to and receiving signals from the slave station by using the same channel, each of the master stations comprising a wireless unit for sending signals to and receiving signals from the slave station, a signal-strength detection unit for detecting strength of a signal received from the slave station, a correspondence table for storing a corresponding relationship between signal strength and transmission timing, the table being set in such a manner that the higher the signal strength of a received signal, the earlier the timing at which frame contained in the signal is transmitted to the LAN, a transmission-timing decision unit for deciding transmission timing using the signal strength of an incoming signal and the correspondence table, a memory unit for storing frame received from the slave station, a carrier detection unit for detecting a carrier on the LAN, and a control unit for determining whether a carrier is present on the LAN when a transmission timing conforming to the strength of the signal received from the slave station arrives, discarding frame from the slave station, rather than transmitting it, if the carrier is present and transmitting the frame to the LAN if the carrier is not present.

Further, in accordance with the present invention, the foregoing objects are attained by providing a wireless LAN system comprising a plurality of master stations connected to a LAN, and slave stations, connected to terminals or to branch LANs, for wirelessly sending signals to and receiving signals from the master stations, each master station sending signals to and receiving signals from the slave station by using the same channel, each of the master stations comprising a wireless unit for sending signals to and receiving signals from the slave station, a signal-strength detection unit for detecting strength of a signal received from the slave station, a correspondence table for storing corresponding relationship between signal strength and transmission timing, the table being set in such a manner that the higher the signal strength of a received signal, the earlier the timing at which frame contained in the signal is transmitted to the LAN, a transmission-timing decision unit for deciding transmission timing using the signal strength of an incoming signal and the correspondence table, a memory unit storing a frame received from the slave station, a comparator for comparing a frame on the LAN with the frame received from the slave station, and a control unit for discarding the frame received from the slave station if a frame identical with the frame received from the slave station is detected on the LAN at or before a transmission timing conforming to the strength of the signal received from the slave station, and transmitting the frame received from the slave station, which frame has been stored in the memory unit, to the LAN if a frame identical with the frame received from the slave station is not detected on the LAN at or by the transmission timing.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS (A) Overview of the invention

Figure 1:
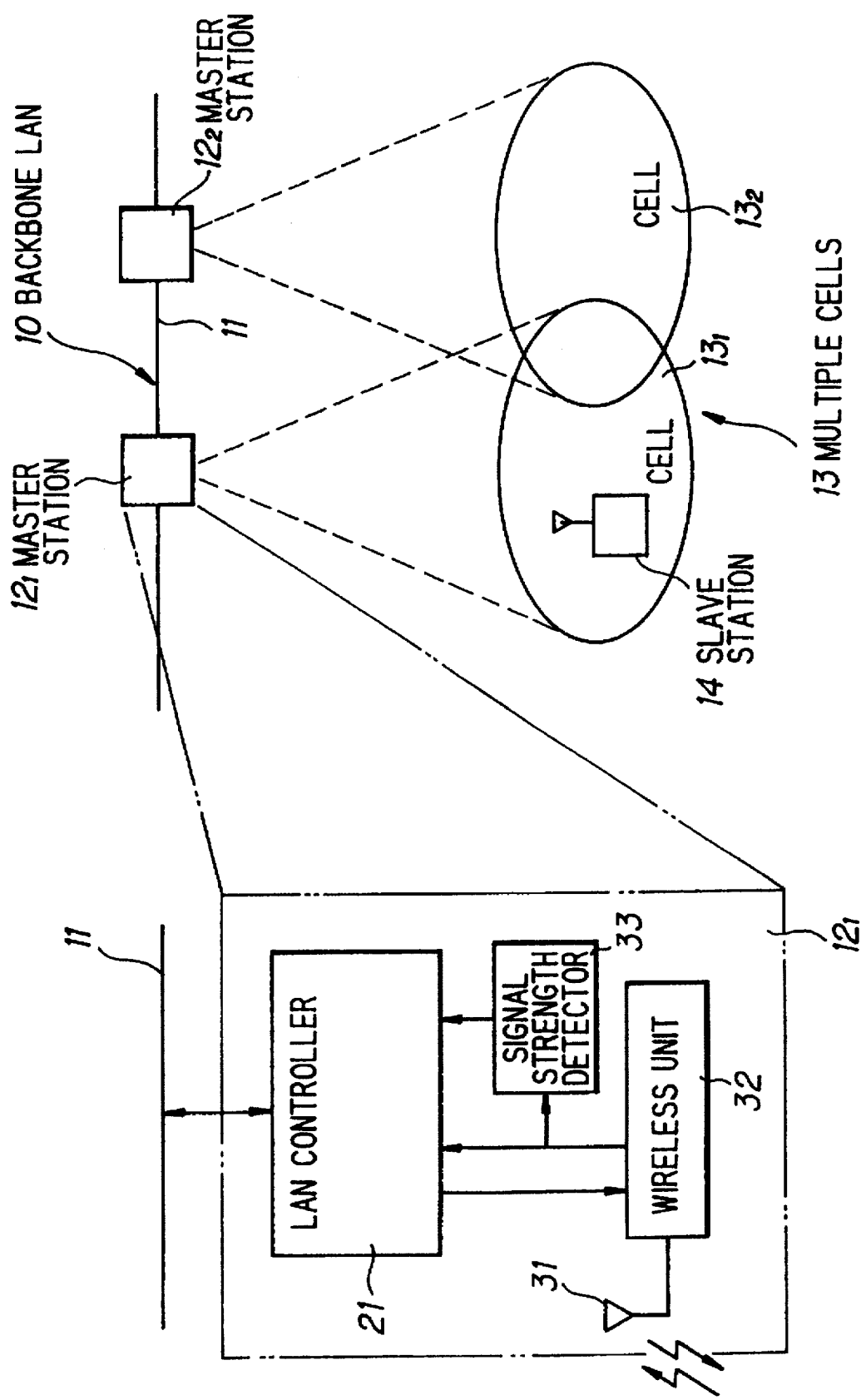
FIG. 1 is a diagram for describing an overview of the present invention.

FIG. 1 is a diagram for describing an overview of the present invention.

As shown in FIG. 1, the wireless LAN system includes a backbone LAN 10 having a basic cable 11 to which master stations $12_1$, $12_2$ possessing a wireless sending/receiving function are connected at suitable locations. Numeral 13 denotes a multiple cell, namely cells $13_1$, $13_2$ corresponding to the master stations $12_1$, $12_2$. Numeral 14 denotes a slave station, which is connected to a terminal or to a branch LAN, for wirelessly sending signals to and receiving signals from a master station.

Each master station includes a LAN controller 21, an antenna 31, a wireless unit 32 for sending signals to and receiving signals from the slave station, and a signal-strength detection unit for detecting the signal strength of a signal received from the slave station.

The LAN controller 21 includes the following units, which are not shown: (1) a correspondence table for storing the corresponding relationship between signal strength and transmission timing, the table being set in such a manner that the higher the signal strength of a received signal, the earlier the timing at which data contained in the signal is transmitted to the backbone LAN 10; (2) a transmission-timing decision unit for deciding transmission timing using the signal strength of an incoming signal and the correspondence table; (3) a memory unit for storing data received from a slave station; (4) a carrier detection unit for detecting a carrier on the backbone LAN; (5) a comparator for comparing a frame on the backbone LAN with a frame received from a slave station; (6) a control unit for controlling discarding or transmission of frames received from a slave station; (7) an address table for storing the addresses of slave stations under supervision; and (8) an address-table management unit for managing the address table.

The master stations $12_1$~$12_2$ detect the strength of a signal received from the slave station 14 and, on the basis of the signal strength, decide a transmission timing at which data contained in the signal is to be sent to the backbone LAN 10. The data received from the slave station is stored in the memory unit. Under these conditions, each master station determines, at arrival of the transmission timing decided, whether a carrier is present on the backbone LAN 10. The master station discards the data from the slave station, and therefore does not send it, if the carrier is present. If the carrier is not present on the backbone LAN, the master station sends the data to the backbone LAN. In this case, the transmission timing is the time lag from the moment data is received to the moment the data is sent to the backbone LAN. If we let T be the time needed to transmit the smallest frame on the backbone LAN, then the maximum lag time will be less than T.

By virtue of the arrangement described above, when two or more master stations $12_1$~$12_2$ receive a signal from the same slave station 14 simultaneously, the master station $12_1$ having the greatest signal strength sends the received frame to the backbone LAN 10 first. The other master station $12_2$ attempts to send the received frame when the above-mentioned frame is flowing through the backbone LAN. However, since the carrier is detected on the backbone LAN, the frame received from the slave station is discarded and not transmitted. Accordingly, frames do not collide. Moreover, traffic on the backbone LAN 10 is reduced and the same frame is not sent to the other party redundantly. In addition, since the sending and receiving of signals between the master and slave stations is carried out on the same channel, the master and slave stations can be simply constructed and it is unnecessary to set or change the channel.

Further, an arrangement may be adopted in which the antenna of the slave station 14 is made an antenna having strong directivity and the antenna is pointed toward the master station $12_1$ of the cell to which the slave station 14 belongs. Accordingly, if there is a transmission from the slave station, the strength of the incoming signal at the master station of the cell to which the slave station belongs can be made larger than the strength of the incoming signal at the other master stations.

Furthermore, when data received from the slave station has been sent to the backbone LAN, the master station determines whether the address of the source of the data transmission has been stored in the address table. If the address has not been stored, then the master station registers the address in the address table. When the master station has received data from the backbone LAN, the master station determines whether the address of the source of the data transmission has been stored in the address table. If the address has been stored, the master station construes that the slave station under supervision thus far has moved and deletes this address from the address table. If this arrangement is adopted, slave stations under supervision can be managed by the address table without complicated control when a slave station moves. By virtue of the fact that the master station wirelessly transmits only the frames addressed to the slave stations under supervision, traffic can be reduced.

Further, the master station is capable of controlling the sending/discarding of received frames in the following manner: Specifically, at the transmission timing conforming to the signal strength of the signal from the slave station, the master station determines whether a frame identical with the frame received from the slave station is present on the backbone LAN. If the identical frame is present, the frame is discarded from the slave station. If the identical frame is not present, the master station sends the frame from the slave station to the backbone LAN after communication of the frame flowing on the LAN is completed. If this arrangement is adopted, other master stations can reliably verify that a received frame has been sent to the backbone LAN. This makes it possible to prevent a situation in which none of the master stations sends a frame, thus assuring that frames will not be lost.

Furthermore, the controller is capable of controlling the sending/discarding of received frames in the following manner: Specifically, the master station constantly senses whether a frame identical with a frame from the slave station is flowing on the backbone LAN before the arrival of the transmission timing decided in dependence upon the signal strength of the signal from the slave station. If the identical frame is detected, the master station discards the frame received from the slave station. If the identical frame is not detected by the arrival of the transmission timing, then the master station sends the backbone LAN the frame received from the slave station. In this case, the above-mentioned transmission timings of each of the master stations are set in such a manner that the interval thereof will be greater than the maximum transmission time of the backbone LAN. If this arrangement is adopted, the other master stations can reliably verify that a received frame has been sent to the backbone LAN. This makes it possible to prevent a situation in which none of the master stations sends a frame, thus assuring that frames will not be lost.

(B) First embodiment of the invention (a) Configuration of wireless LAN

Figure 2:
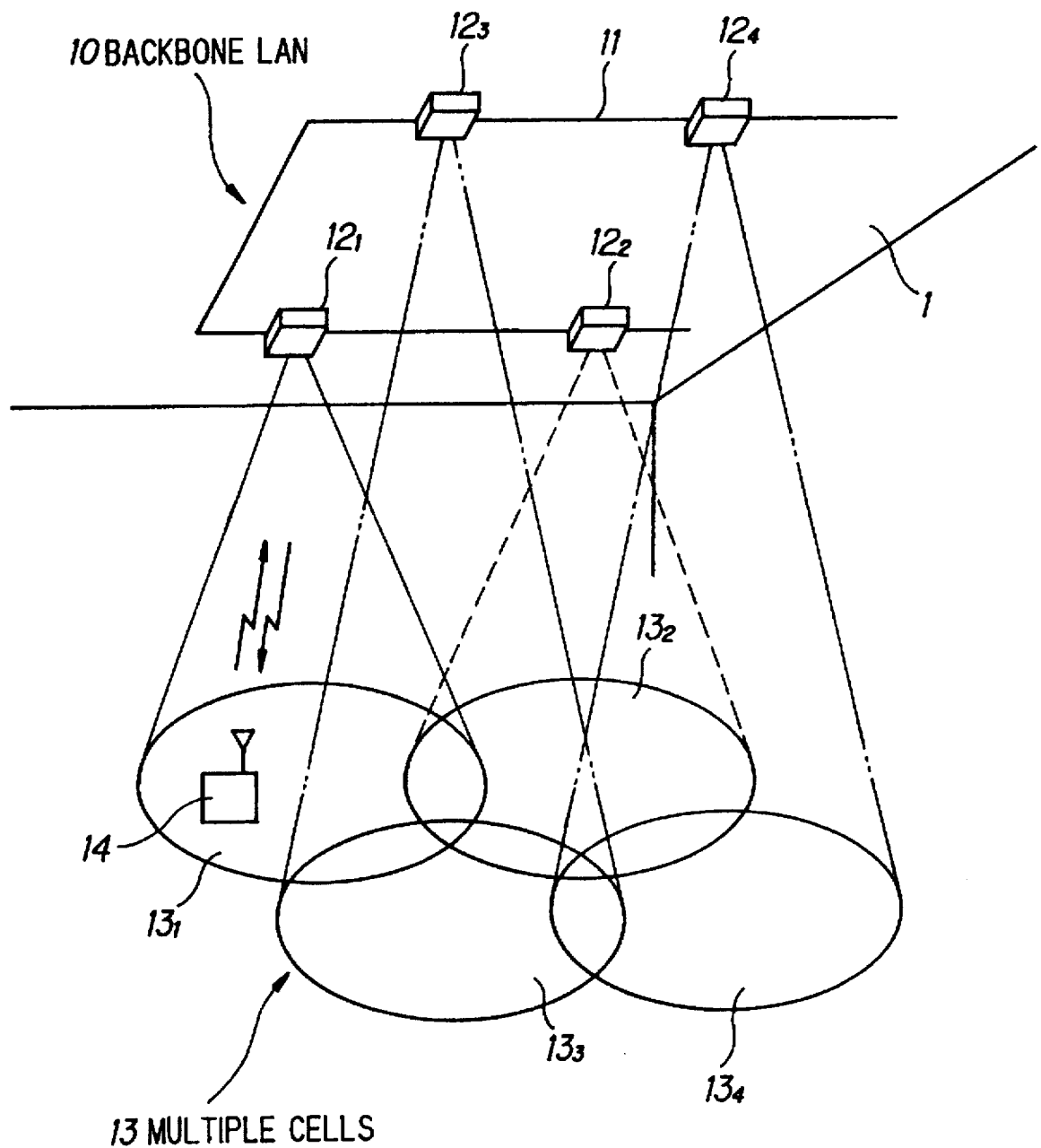
FIG. 2 is a diagram showing the configuration of a wireless LAN to which the present invention can be applied.

FIG. 2 is a diagram showing the configuration of a wireless LAN to which the present invention can be applied. As shown in FIG. 2, the backbone LAN 10 is installed on a ceiling 1 of a room. Numeral 11 denotes the basic cable. Master stations $12_1 \sim 12_4$ possessing a wireless sending/receiving function are connected to the basic cable 11 at suitable locations and each of the master stations sends signals to and receives signals from the slave station 14 by using the same channel. The backbone LAN 10 may be constituted by a wired LAN or by a wireless LAN. Numeral 13 denotes the multiple cell, namely cells $13_1 \sim 13_4$ or areas in which signals can be sent to and received from the master stations $12_1 \sim 12_4$. The slave station 14 is connected to a terminal or to a branch LAN and wirelessly sends signals to and receives signals from a master station.

A frequency band exhibiting excellent rectilinear propagation, such as the millimeter wave band or infrared light, is used as the wireless signal. As for the antennae of the master stations $12_1 \sim 12_4$, use is made of an antenna having a radiation angle which, when the antenna is attached to the ceiling, is capable of constructing a cell having a radius on the order of several meters to several tens of meters. The slave station 14 employs an antenna having strong directivity to avoid interfering with the master stations of other cells and to avoid the influence of multiple paths. The antenna is pointed toward the master station $12_1$ of the cell $13_1$ to which the slave station 14 belongs.

Thus, the arrangement is such that when a frame is transmitted from a slave station, the signal strength of the incoming signal at the master station of the cell to which this slave station belongs will be considerably larger than that of an incoming signal at the master station of an adjacent cell when the signal arrives owing to leakage or reflection of the signal.

It should be noted that while four master stations are shown in FIG. 2, the master stations may be of any number so long as there are two or more. Further, though only one slave station is illustrated, each cell has a plurality of slave stations.

(b) Master station

Figure 3:
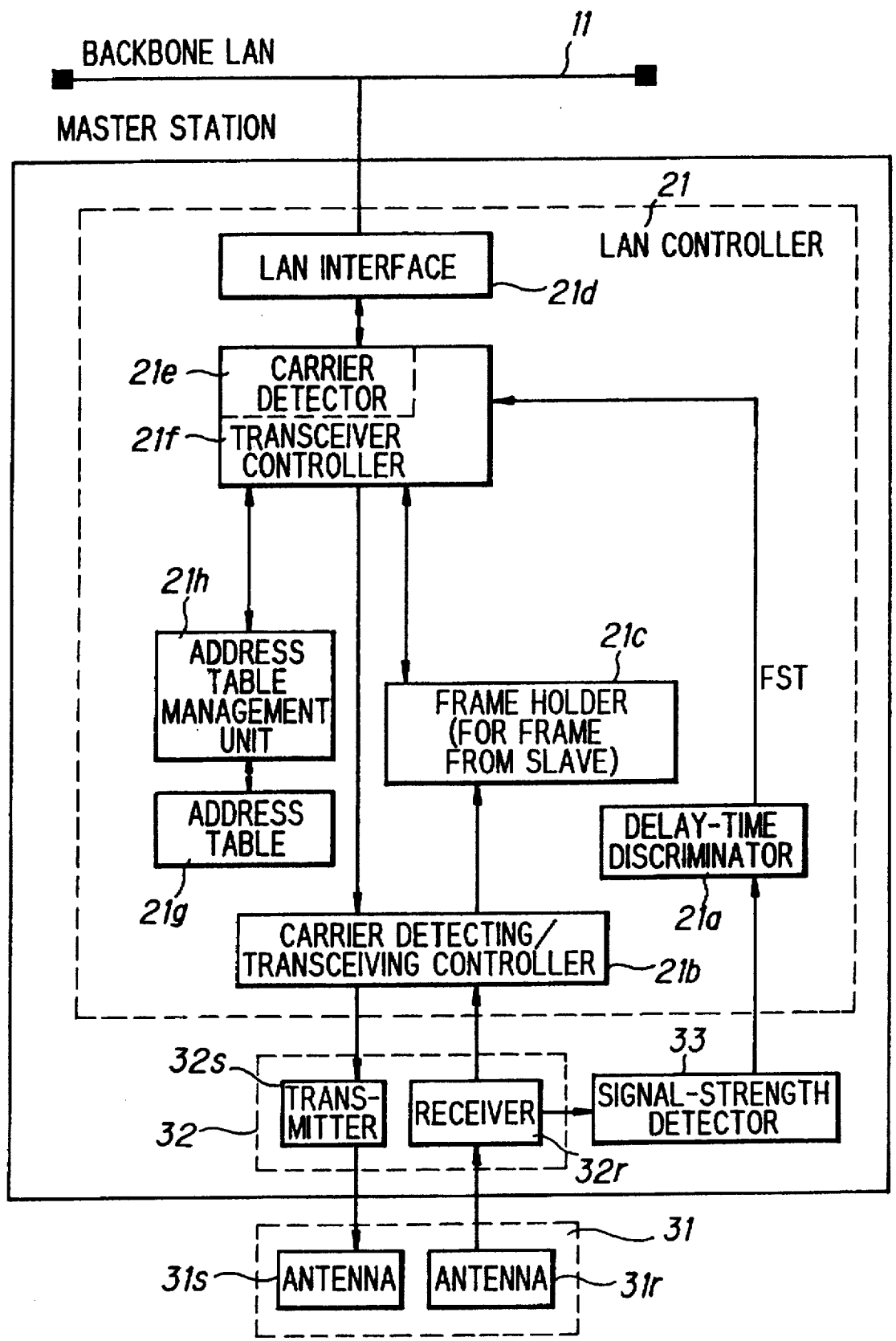
FIG. 3 is a block diagram showing the construction a master station.

FIG. 3 is a block diagram showing the construction of a master station. The master station includes a LAN controller 21 and an antenna 31, which includes a transmitting antenna 31s and a receiving antenna 31r. An arrangement may be adopted in which these antennae are shared. A wireless section 32, which is for sending signals to and receiving signals from a slave station, includes a receiver 32r and a transmitter 32s. The master station further includes a signal-strength detection unit 33 for detecting the strength of a signal received from a slave station.

Figure 4:
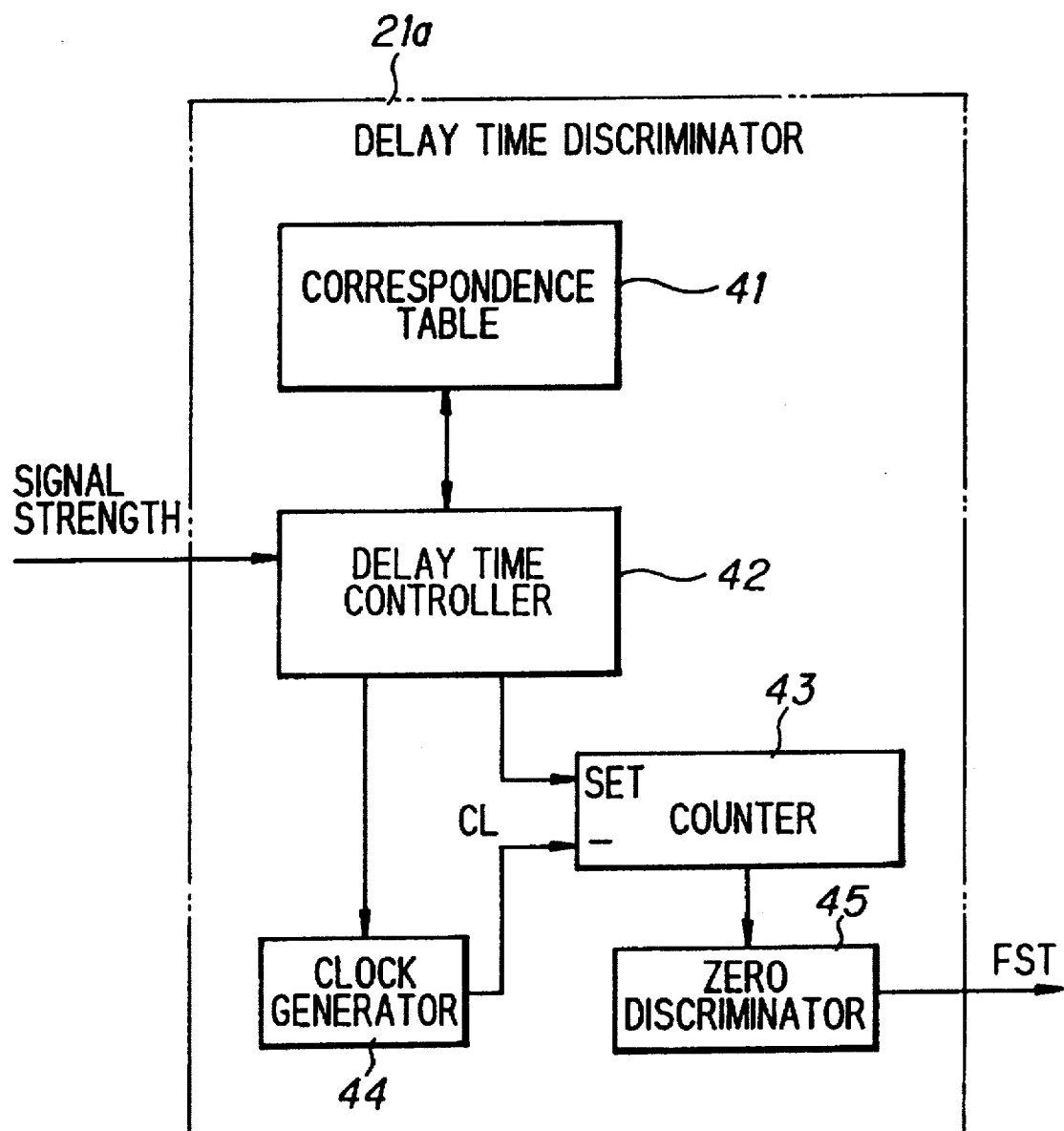
FIG. 4 is a block diagram showing the construction of a delay-time determination unit.

The LAN controller 21 has a delay-time decision unit 21a which, on the basis of the strength of the received signal, delays the time of transmission of a frame (data) contained in the received signal. As shown in FIG. 4, the delay-time decision unit 21a includes a correspondence table 41 for storing the corresponding relationship between signal strength of a received signal and transmission timing, a delay-time controller 42 for deciding transmission timing (delay time) conforming to signal strength, a counter 43 the content of which is counted down whenever a clock signal CL is generated, a clock generator 44 for generating the clock signal CL at a prescribed time interval, and a zero discriminator 45 for determining whether the count in the counter 43 has reached zero or not and outputting a frame-transmission timing signal FST when the count has reached zero.

The correspondence table 41 stores the corresponding relationship between the strength of a received signal and the transmission timing of the received frame within a prescribed range of signal strengths. Transmission timing is decided in such a manner that the higher the signal strength of a received signal, the earlier the timing at which the received frame is transmitted to the backbone LAN 11. More specifically, if the signal strength is maximum, frame-transmission delay time is zero. The smaller the signal strength becomes, the longer the frame-transmission delay time is made. However, if we let T be the time needed to transmit the smallest frame on the backbone LAN 11 (the smallest frame is 64 octets in the case of Ethernet), then the maximum delay time will be less than T. The reason for this is to arrange it so that a carrier can be reliably detected on the backbone LAN when another master station whose signal strength is small sends a frame.

With reference to again to FIG. 3, the LAN controller 21 further includes a carrier detecting/transceiving controller 21b on the wireless side, a frame holding unit 21c for storing a frame received from a slave station, a LAN interface 21d for interfacing the backbone LAN 11, a carrier detector 21e for detecting a carrier on the backbone LAN 11, a transceiving controller 21f on the side of the backbone LAN for controlling the discarding or transmission of a frame received from a slave station and for controlling the acceptance of a frame from the backbone LAN, an address table 21g for storing the addresses of slave stations under supervision, and an address-table management unit 21h for managing the address table 21g.

(c) Slave station

Figure 5:
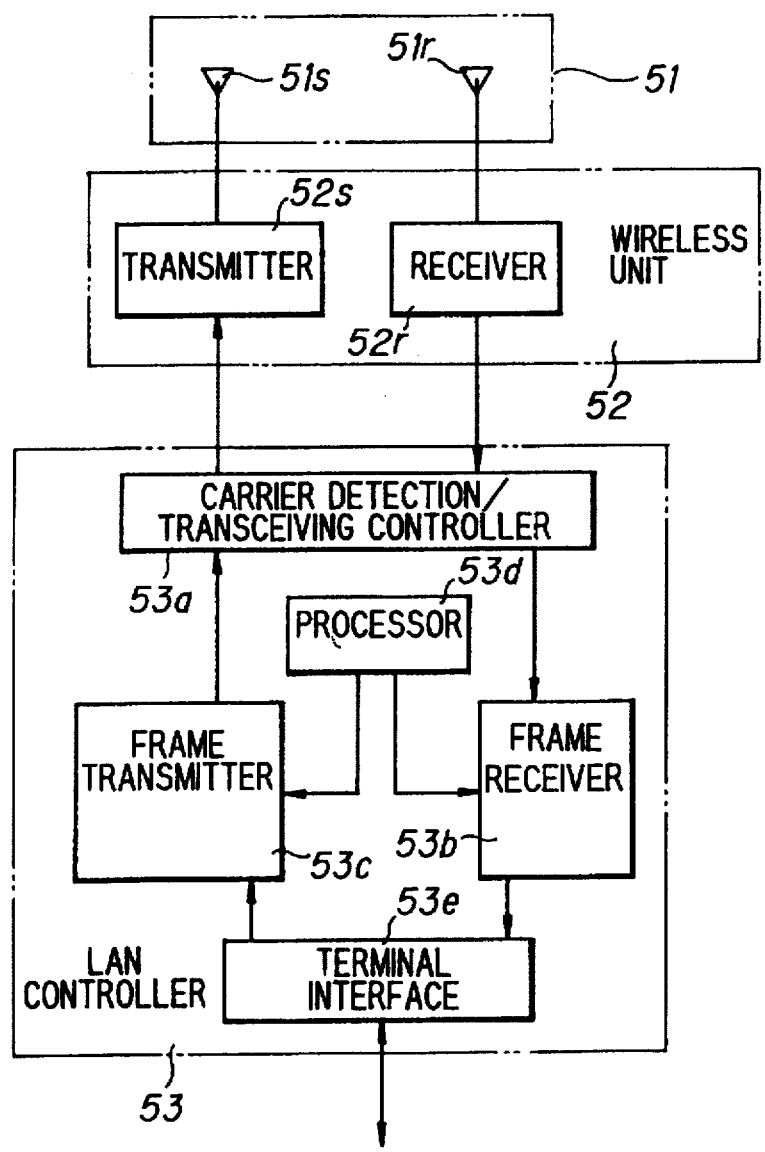
FIG. 5 is a block diagram showing the construction of a slave station.

FIG. 5 is a block diagram showing the construction of the slave station. The slave station includes an antenna 51 having a receiving antenna 51r and a transmitting antenna 51s. These antenna can be used jointly as a single antenna. The antenna 51r, 51s are constructed to have directivity and are adjusted so as to point toward the antenna of the master station of the cell to which the slave station belongs. The slave station further includes a LAN controller 53 having a carrier detecting/transceiving controller 53a for detecting a carrier and controlling the sending/receiving of frames, a frame receiver 53b, a frame transmitter 53c, a frame processor 53d and a terminal interface 53e.

(d) Frame composition

Figure 6:
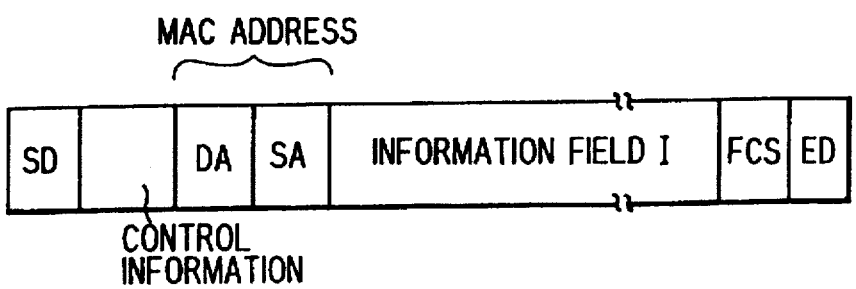
FIG. 6 is a diagram showing the composition of a frame.

FIG. 6 is a diagram showing the composition of a frame. A control field, a layer-2 MAC address (constituted by a destination address DA and a sending address SA), an information field I and a frame checking sequence FCS are placed between a start delimiter SD and an end delimiter ED.

(e) Control of sending and discarding of frames from slave station

Figure 7:
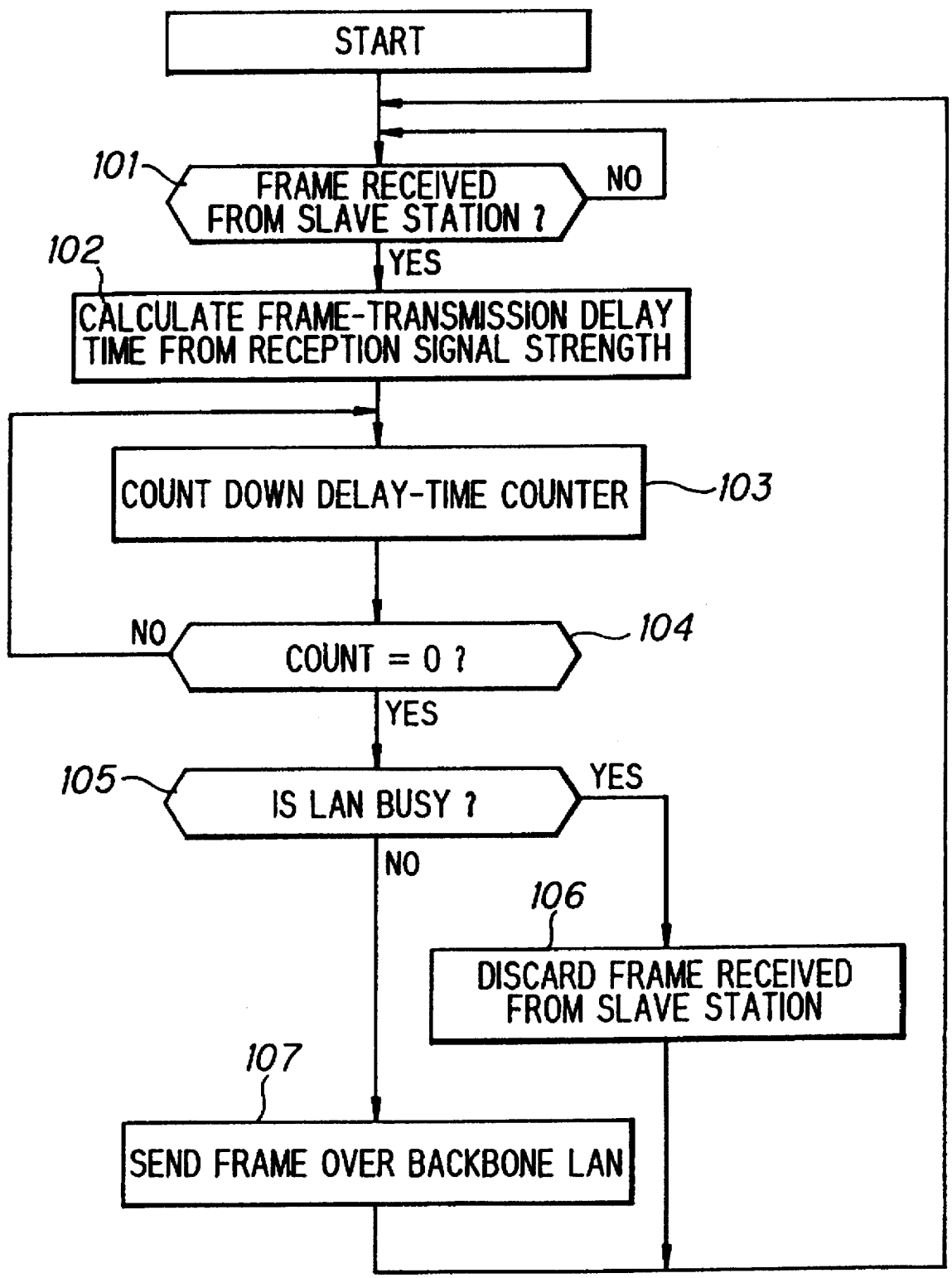
FIG. 7 is a flowchart of control for sending and discarding frames from a slave station.

FIG. 7 is a flowchart of control for sending and discarding frames received from a slave station.

When a signal is received from a slave station, the signal-strength detection unit 33 detects the received signal strength and applies a signal indicative thereof to the delay-time decision unit 21a. Further, the carrier detecting/transceiving unit demodulates the frame (data) contained in the received signal and stores the frame in the frame holding unit 21c (step 101). The time-delay controller 42 (FIG. 4) of the delay-time decision unit 21a reads the delay time conforming to the signal strength out of the correspondence table 41 and sets the delay time in the counter 43 (step 102). The counter 43 then starts counting down its content (step 103).

The zero discriminator 45 of the delay-time decision unit 21a determines whether the content of the counter 43 has become zero or not (step 104). If content has become zero, then the zero discriminator 45 outputs the frame-transmission timing signal FST.

When the frame-transmission timing signal FST is generated, the transceiving controller 21f checks to see whether a carrier has been detected on the backbone LAN 11. More specifically, it is determined whether the backbone LAN is busy or not (step 105).

If the LAN is busy, it is judged that another master station whose signal strength is larger is sending the received frame from the slave station, the frame that has been stored in the frame holding unit 21c is discarded and the frame is not transmitted (step 106). The reason for this is that when a master station whose signal strength is small sends a received frame, a master station having a large signal strength is already sending the received frame to the backbone LAN 11 and, hence, the backbone LAN is busy.

The program then returns to the beginning and the system waits for reception of the next frame.

If the LAN is not busy when the master station sends the received frame, then a "NO" decision is rendered at step 105 and the transceiving controller 21f sends the backbone LAN 11 the frame from the slave station, which frame has been stored in the frame holding unit 21c (step 107). The fact that the LAN is not busy when the master station sends the received frame means that the reception signal strength is maximum at this master station.

The program then returns to the beginning and the system waits for reception of the next frame.

It should be noted that the frame sent to the backbone LAN 11 is accepted by the master station which has the slave station that is the destination of the frame under its supervision. This master station transmits the frame to this slave station via the wireless unit.

In summation, therefore, even when two or more master stations simultaneously receive a frame from the same slave station, the master station for which the signal strength is the highest is the one which sends the received frame to the backbone LAN first. Though another master station attempts to send the received frame when the above-mentioned frame is flowing on the backbone LAN, this master station detects the carrier and, as a consequence, discards the received frame instead of sending it upon judging that the master station whose signal strength is highest is already sending a received frame.

If control for sending/discarding a frame from a slave station is thus carried out, frame collision is avoided, the traffic on the backbone LAN can be reduced and identical frames are not sent to the receiving party redundantly.

(f) Control for management of address table

In parallel with the above described control for sending or discarding frames, the address-table management unit 21h performs control for updating the address table 21g storing the addresses of slave stations that are under supervision.

Figure 8:
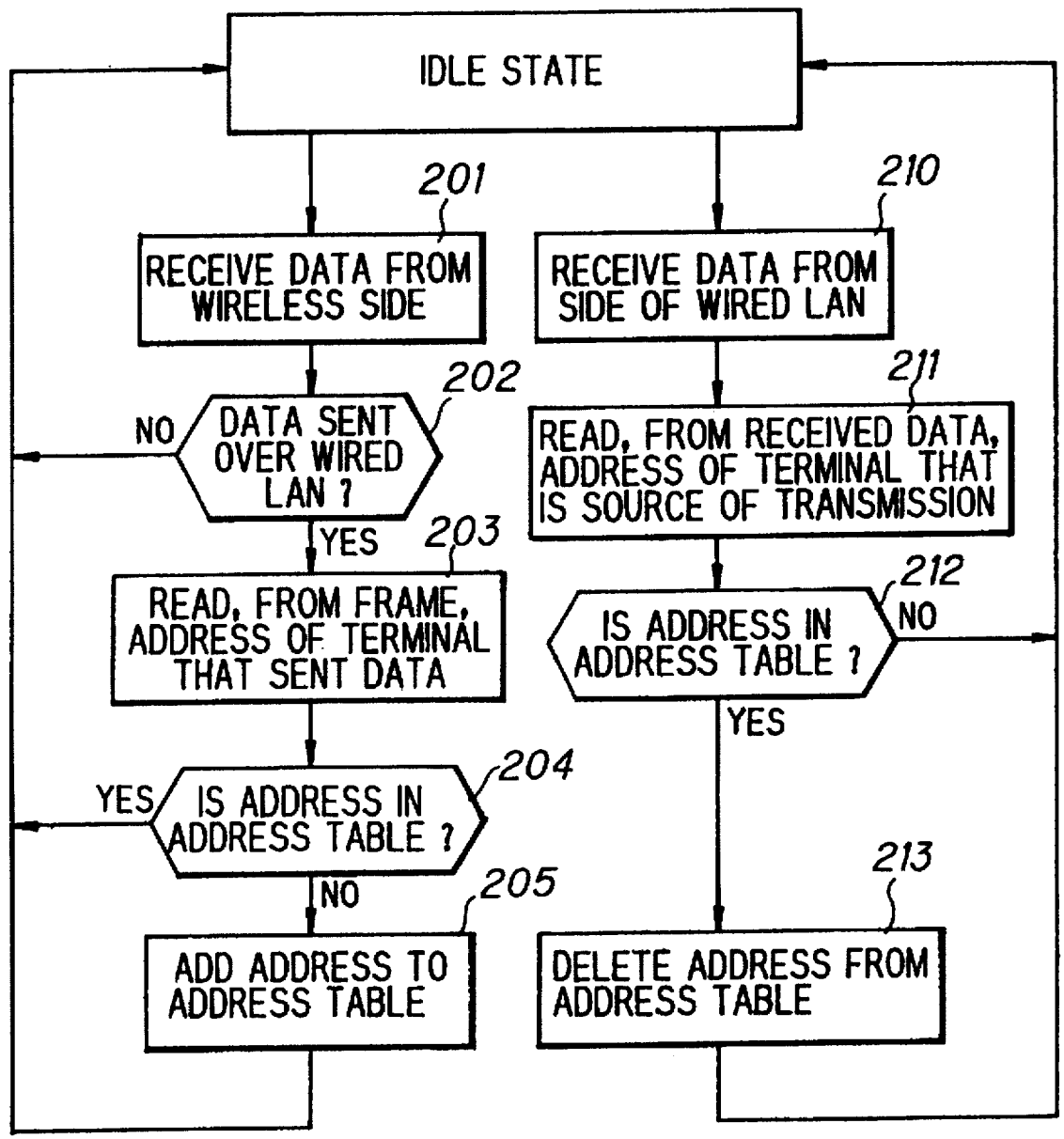
FIG. 8 is a flowchart of control for managing an address table.

FIG. 8 is a flowchart of control for managing an address table.

If a frame is received from a slave station, the above-described control for sending/discarding the frame is executed (step 201). In response to such control for sending/discarding frames, the transceiving controller 21f notifies the address management unit 21h of whether the received frame has been discarded.

If the frame has been discarded, control for updating the address table 21g is terminated and the system waits for the next notification. In a case where a frame from a slave station has been sent to the backbone LAN 11, however, the transceiving controller 21f notifies the address management unit 21h of the frame sending address SA contained in the frame (steps 202, 203).

The address management unit 21h determines whether the sending address SA has been registered in the address table 21g (step 204). If the sending address SA has been registered, the system waits for the next notification. If the sending address SA has not been registered, however, the address management unit 21h judges that a slave station has been placed in the cell anew, or that a slave station has moved into the cell from another cell by movement of the slave station, and registers the address in the address table 21g (step 205). The system then waits for the next notification.

The antenna of the slave station has directivity and broadcasts radio waves toward the master station to which this slave station belongs. Moreover, this master station is closest to the slave station in terms of distance. Accordingly, when there is a transmission from the slave station, the strength of the incoming signal is maximum at the master station of the cell to which this slave station belongs and this master station sends the frame from the slave station to the backbone LAN. In other words, this means that the master station which sends the frame from the slave station to the backbone LAN 10 has this slave station under its supervision. Accordingly, by registering, at steps 204~205, the address of the slave station in the address table 21g of the master station that sent the received frame from the slave station, the slave station under supervision is managed.

On the other hand, if a frame is received from the backbone LAN 10 (step 210), the transceiving controller 21f extracts the sending address (the address of the slave station that transmitted the frame) from the frame containing the address and notifies the address management unit 21h (step 211). The address management unit 21h determines whether this address has been registered in the address table 21g (step 212) and waits for next notification if the address has not been registered. If the address has been registered, however, the address management unit 21h deletes this address from the address table 21g (step 213).

The fact that another master station has send the backbone LAN 11 a frame from a slave station means that this slave station is under the supervision of this other master station. Consequently, if the address of this slave station has been stored in the address table 21g, this means that this slave station has moved between cells. Accordingly, the address of this slave station is deleted from the address table at step 213 and, as a result, the slave station under supervision can be managed accurately.

If slave stations under control are thus managed by an address table, a master station is capable of performing control in which it wirelessly transmits only the frames addressed to a slave station under its supervision from among the frames accepted by the backbone LAN 11. This makes it possible to reduce traffic.

(C) Second embodiment of the invention (a) Overview

The first embodiment is such that when a master station sends a frame received from a slave station, control to send or discard the frame is performed based upon whether the backbone LAN is busy or not. A second embodiment is so adapted that when a master station sends a frame received from a slave station, control to send or discard the frame is performed in such a manner that it is judged whether a frame identical with the received frame is flowing on the backbone LAN, the master station sends the frame to the backbone LAN if the identical frame is not flowing on the backbone LAN and discards the frame if the identical frame is flowing.

(b) Construction

Figure 9:
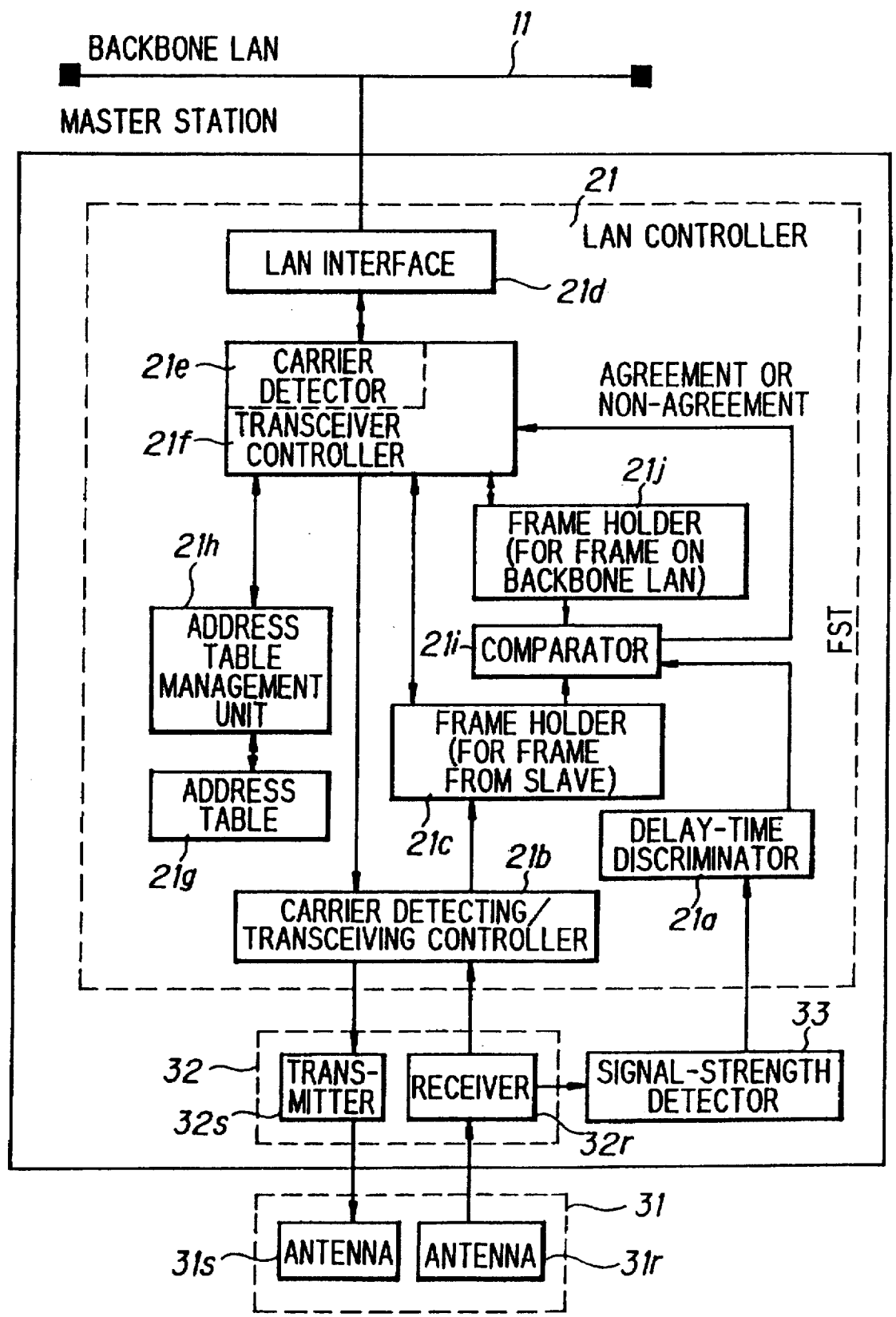
FIG. 9 is a block diagram showing the construction of a master station according to a second embodiment of the invention.

FIG. 9 is a block diagram showing the construction of a master station according to the second embodiment of the invention. Components identical with those of the master station according to the first embodiment (FIG. 3) are designated by like reference characters. This master station differs from that of FIG. 3 in the provision of a comparator 21i and a frame holding unit 21j, which holds a frame that is on the backbone LAN. When the frame-transmission timing signal FST is generated, the comparator 21i compares a frame accepted from the backbone LAN and stored in the frame holding unit 21j with a frame received from a slave station, which frame has been stored in the frame holding unit 21c. The comparator determines whether the two frames are identical and notifies the transceiving controller 21f of the result.

(c) Sending/discarding control

Figure 10:
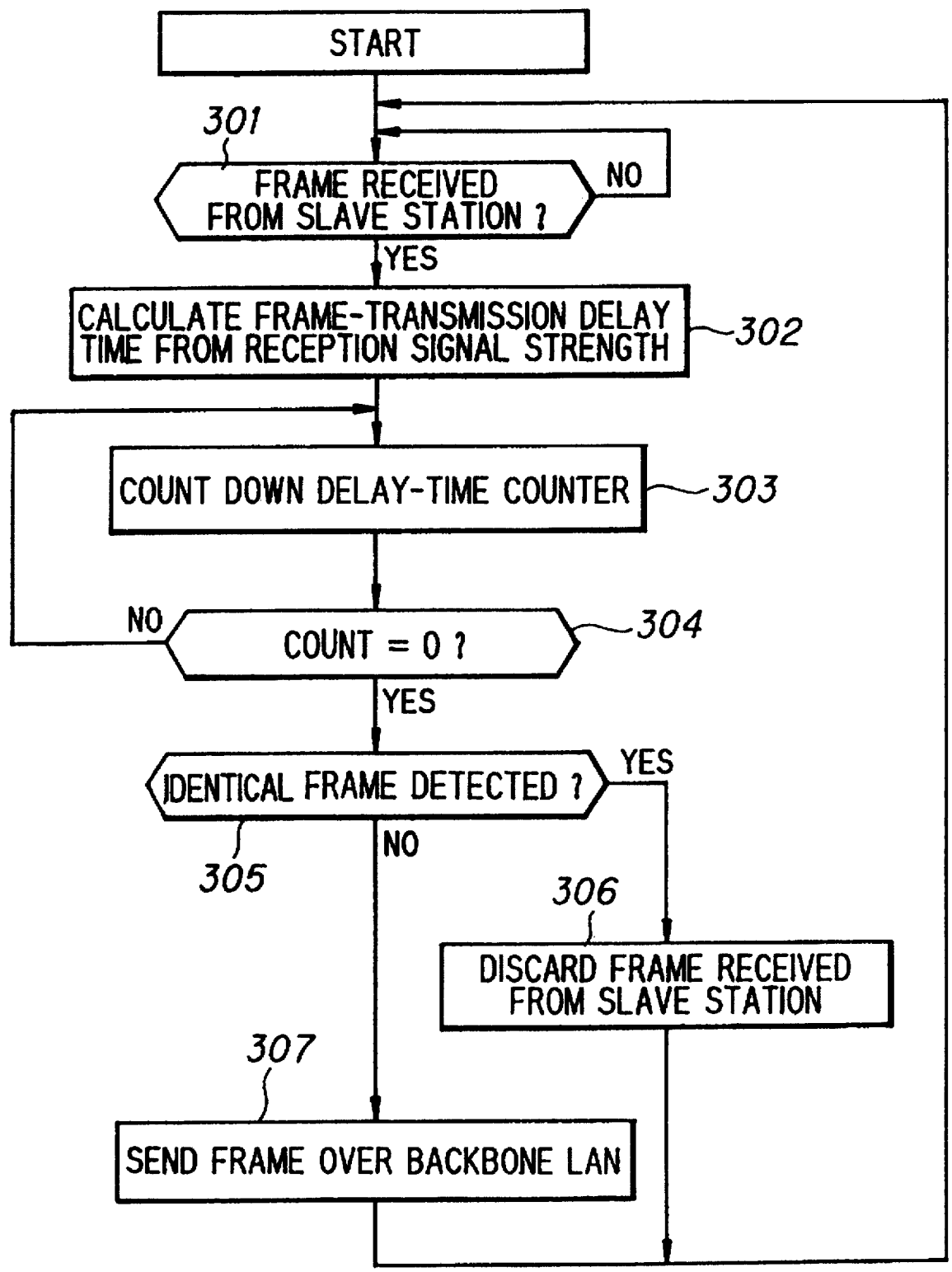
FIG. 10 is a flowchart of control for sending and discarding frames in the second embodiment of the invention.

FIG. 10 is a flowchart of control for sending and discarding frames received from a slave station.

When a signal is received from a slave station, the signal-strength detection unit 33 detects the received signal strength and applies a signal indicative thereof to the delay-time decision unit 21a. Further, the carrier detecting/transceiving unit demodulates the frame contained in the received signal and stores the frame in the frame holding unit 21c (step 301). The time-delay controller 42 (FIG. 4) of the delay-time decision unit 21a reads the delay time conforming to the signal strength out of the correspondence table 41 and sets the delay time in the counter 43 (step 302). The counter 43 then starts counting down its content (step 303).

The zero discriminator 45 of the delay-time decision unit 21a determines whether the content of the counter 43 has become zero or not (step 304). If content has become zero, then the zero discriminator 45 outputs the frame-transmission timing signal FST.

When the frame-transmission timing signal FST is generated, the comparator 21i compares the latest frame accepted from the backbone LAN and stored in the frame holding unit 21j with the frame received from the slave station, which frame has been stored in the frame holding unit 21c. The comparator 21i determines whether the two frames are identical and notifies the transceiving controller 21f of the result (step 305). Methods of determining whether the frames are identical include a method of comparing all of the data in the frames and deciding whether the items of compared data agree or disagree, a method of comparing the headers (control information, MAC addresses) of the frames and deciding whether the headers agree or disagree, etc.

If the transceiving controller 21f receives notification of the fact that the two frames are identical, the controller 21f judges that another master station whose reception signal strength is greater than that of its own master station is sending the received frame from the slave station, discards the frame that has been stored in the frame holding unit 21c and does not send this frame (step 306). The fact that an identical frame is flowing on the backbone LAN when the master station sends the received frame means that a master station whose reception signal strength is greater than that of the master station of the controller 21f exists.

The program then returns to the beginning and the system waits for reception of the next frame.

If the transceiving controller 21f receives notification of the fact that the two frames do not agree, then a "NO" decision is rendered at step 305 and the transceiving controller 21f sends the backbone LAN 11 the frame from the slave station, which frame has been stored in the frame holding unit 21c, upon conclusion of communication of the frame presently flowing on the backbone LAN (step 307). The fact that an identical frame is not flowing on the backbone LAN when the master station sends the received frame means that the reception signal strength is maximum at this master station.

The program then returns to the beginning and the system waits for reception of the next frame.

In summation, therefore, even when two or more master stations simultaneously receive a frame from the same slave station, the master station for which the signal strength is the highest is the one which sends the received frame to the backbone LAN first. Though another master station attempts to send the received frame when the above-mentioned frame is flowing on the backbone LAN, this master station detects the identical frame and, as a consequence, discards the received frame instead of sending it.

If control for sending/discarding a frame from a slave station is thus carried out, frame collision is avoided, the traffic on the backbone LAN can be reduced and identical frames are not sent to the receiving party redundantly.

In addition, since a received frame is discarded when an identical frame is judged to be flowing on the backbone LAN, the master station which received the frame at the highest signal strength will not discard the frame but will transmit it reliably to the terminal that is the destination of the frame.

Control for address management in the second embodiment is the same as that performed in the first embodiment.

(D) Third embodiment (a) Construction

According to a third embodiment of the invention, a master station constantly performs monitoring, until it sends a frame received from a slave station, to determine whether an identical frame is flowing on the backbone LAN. The master station performs frame sending/discarding control in such a manner that the master station sends the frame to the backbone LAN if an identical frame is not detected and discards the frame if the identical frame is detected.

Figure 11:
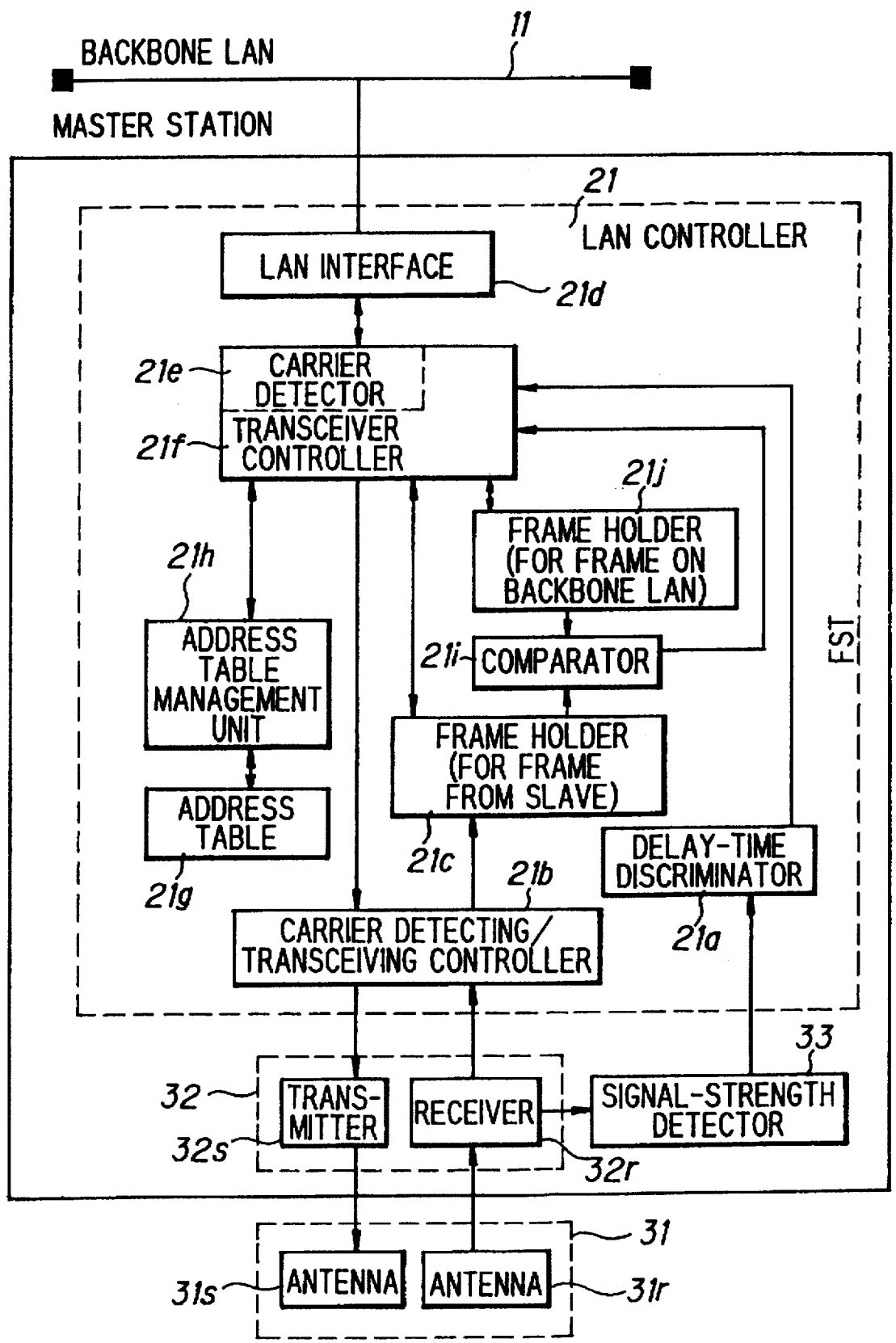
FIG. 11 is a block diagram showing the construction of a master station according to a third embodiment of the invention.

FIG. 11 is a block diagram showing the construction of a master station according to the third embodiment of the invention. Components identical with those of the master station according to the second embodiment (FIG. 9) are designated by like reference characters. This master station differs from that of FIG. 9 in that the frame-transmission timing signal FST outputted by the delay-time decision unit 21a enters the transceiving controller 21f.

According to the third embodiment, the corresponding relationship between signal strength and transmission timing in the correspondence table 41 (FIG. 3) is set in such a manner that the interval of frame transmission time of each master station conforming to signal strength is longer than the maximum transmission time of the backbone LAN.

(b) Frame sending/discarding control

Figure 12:
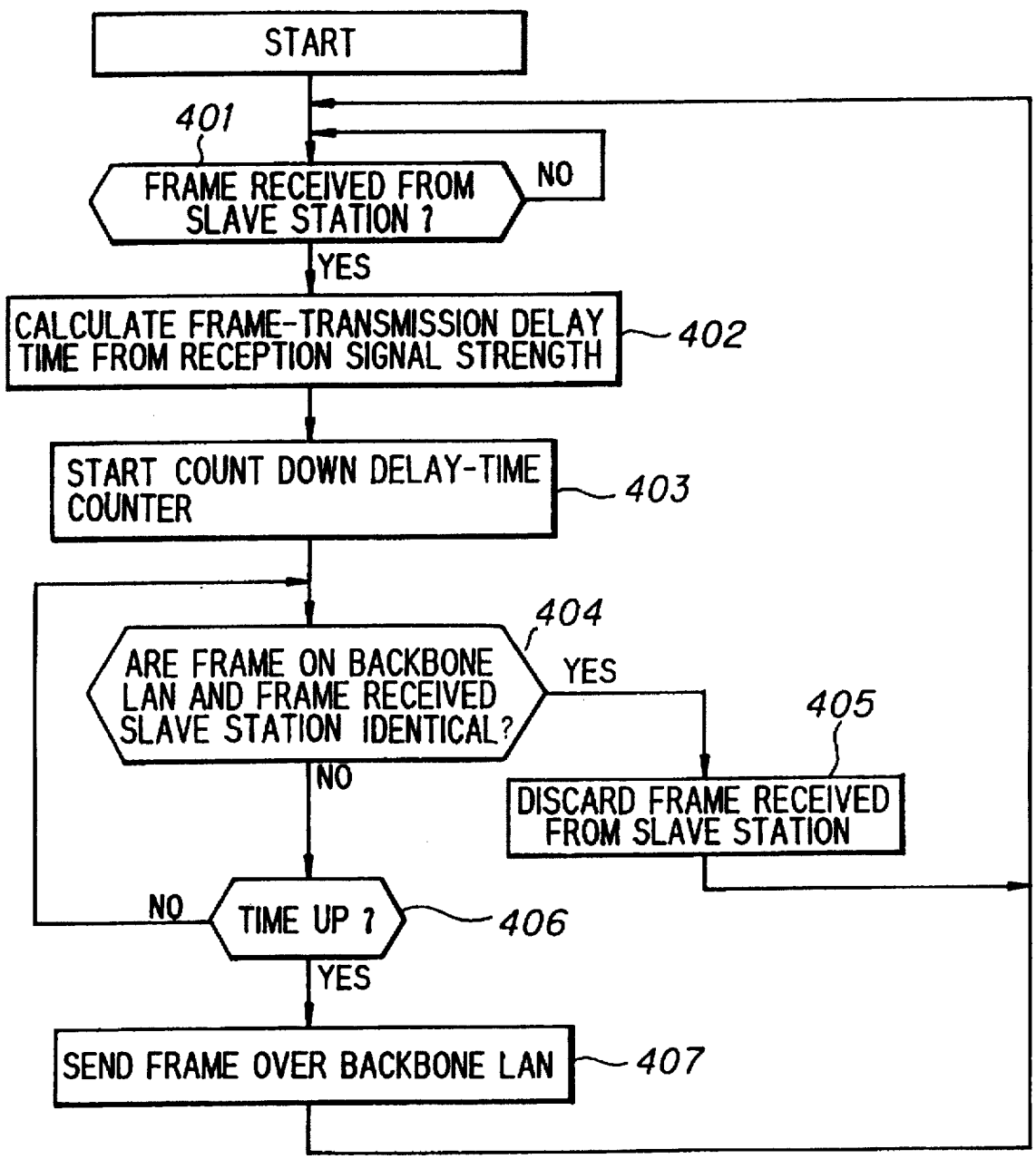
FIG. 12 is a flowchart of control for sending and discarding frames in the third embodiment of the invention.

FIG. 12 is a flowchart of control for sending and discarding frames received from a slave station.

When a signal is received from a slave station, the signal-strength detection unit 33 detects the received signal strength and applies a signal indicative thereof to the delay-time decision unit 21a. Further, the carrier detecting/transceiving unit demodulates the frame (data) contained in the received signal and stores the frame in the frame holding unit 21c (step 401). The time-delay controller 42 (FIG. 4) of the delay-time decision unit 21a reads the delay time conforming to the signal strength out of the correspondence table 41 and sets the delay time in the counter 43 (step 402). The counter 43 then starts counting down its content (step 403).

The transceiving controller 21f constantly accepts frames on the backbone LAN 11 and stores the frames in the frame holding unit 21j. The comparator 21i constantly compares frames accepted from the backbone LAN and stored in the frame holding unit 21j with frames received from a slave station, which frames have been stored in the frame holding unit 21c. The comparator 21i judges whether the compared frames are identical and notifies the transceiving controller 21f of the result (step 404).

If the transceiving controller 21f receives notification of frame identity from the comparator 21i, the controller 21f judges that a master station whose signal strength is greater than that of its own master station is sending a received frame from the slave station, discards the frame that has been stored in the frame holding unit 21c and does not send this frame (step 405). The reason for this is that a master station having the highest signal strength is already sending the frame from the slave station to the backbone LAN 11.

The program then returns to the beginning and the system waits for reception of the next frame.

If the transceiving controller 21f receives notification of the fact that the two frames do not agree, then it judges whether the frame transmission timing has arrived or not (step 406). If the frame transmission timing has not arrived, the comparator 21i repeats the foregoing processing by comparing a frame accepted from the backbone LAN and stored in the frame holding unit 21j with a frame received from the slave station, which frame has been stored in the frame holding unit 21c, judging whether the compared frames are identical and notifying the transceiving controller 21f of the result.

If a frame identical with the frame received from the slave station is detected on the backbone LAN before the transmission timing arrives, then this frame is discarded at step 405. However, if a frame identical with the frame received from the slave station is not detected on the backbone LAN even when the transmission timing arrives, the transceiving controller 21f responds to generation of the frame-transmission timing signal FST by sending the backbone LAN 10 the frame, from the slave station, that has been stored in the frame holding unit 21c (step 407). The program then returns to the beginning and the system waits for reception of the next frame.

In summation, therefore, even when two or more master stations simultaneously receive a frame from the same slave station, the master station which receives the signal at the highest signal strength is the one which sends the received frame to the backbone LAN first. Though another master station then attempts to send the received frame, this master station detects the carrier on the LAN and, as a consequence, discards the received frame instead of sending it upon judging that the master station whose signal strength is highest is already sending a received frame. As a result, frame collision is avoided, the traffic on the backbone LAN can be reduced and identical frames are not sent to the receiving party redundantly. Further, since the sending and receiving of signals between the master station and the slave station is performed on the same channel, the master station and slave station can be constructed in simple fashion and it is unnecessary to set or change the channel.

In accordance with the present invention, the interval of the frame transmission timing of each of the master stations for which the signal strengths differ is made less than the time needed to communicate the smallest frame on the backbone LAN. As a result, when a master station other than the master station that has received a signal at the highest signal strength sends a received frame, the carrier can be reliably detected on the backbone LAN and the frame can be discarded.

Furthermore, in accordance with the present invention, a highly directional antenna is used as the antenna of the slave station. By pointing the antenna at the master station to which the slave station belongs, the reception signal strength at the master station of the cell to which the slave station belongs can be made larger than that at other master stations.

In accordance with the present invention, when a frame received from the slave station has been sent to the backbone LAN, the master station determines whether the address of the source of the frame transmission has been stored in an address table. If the address has not been stored, then the master station registers the address in the address table. When the master station has received the frame from the backbone LAN, the master station determines whether the address of the source of the frame transmission has been stored in the address table. If the address has been stored, the master station construes that the slave station has moved and deletes this address from the address table. As a result, the master station is capable of managing the slave stations under its supervision through simple control. In addition, the master station selects, and wirelessly transmits, only the frames addressed to the slave stations under its supervision, these frames being selected from among the frames accepted from the backbone LAN. This makes it possible to reduce traffic.

Further, in accordance with the present invention, when two or more master stations receive a frame from the same slave station at the same time, the master station for which the signal strength is the highest is the one which sends the received frame to the backbone LAN first. If the fact that this frame is flowing on the backbone LAN is detected up to the time another master station sends the received frame, it is judged that a master station for which the signal strength is highest is already sending the received frame. Hence, the received frame is discarded instead of being sent. Since control for sending/discarding a frame from a slave station is thus performed, frame collision does not occur, traffic on the backbone LAN can be reduced and identical frames are not sent to the receiving party redundantly. In addition, since discarding of a received frame is performed upon judging whether an identical frame is flowing on the backbone LAN, the master station that has received the frame at the highest signal strength will not discard the frame and will always transmit the frame to the destination terminal. Further, the interval of transmission timings of master stations for which the reception signal strengths are different is made at least the maximum transmission time of the backbone LAN. As a result, frames transmitted from the same slave station can be prevented from colliding on the backbone LAN and identical frames can be prevented from being sent on the backbone LAN a plurality of times. Furthermore, a LAN other than of the CSMA/CD type can be used as the backbone LAN.

As many apparently widely different embodiments of the present invention can be made without departing from the spirit and scope thereof, it is to be understood that the invention is not limited to the specific embodiments thereof except as defined in the appended claims.

What is claimed is:

1. A wireless LAN system comprising a plurality of master stations connected to a LAN and slave stations wirelessly connected for sending signals to and receiving signals from the master stations, each master station sending signals to and receiving signals from the slave station by using the same channel, each master station comprising:

a wireless unit for sending signals to and receiving signals from a slave station;

a signal-strength detection unit for detecting strength of a signal received from the slave station;

a correspondence table for storing a corresponding relationship between signal strength and transmission timing, said correspondence table being set in such a manner that the higher the signal strength of a received signal, the earlier the timing at which a frame contained in the signal is transmitted to the LAN;

a transmission-timing decision unit for deciding transmission timing using the signal strength of a received signal, detected by the signal strength detection unit, and said correspondence table;

a memory unit for storing a frame received from the slave station;

a carrier detection unit for detecting a carrier on the LAN; and a control unit for determining whether the carrier detection unit has detected a carrier on the LAN by utilizing a transmission timing provided by said transmission-timing decision unit in accordance with the strength of the signal received from the slave station, detected by the signal strength detection unit, discarding the frame contained in said signal received from the slave station, if the carrier is present on the LAN and transmitting the frame to the LAN if the carrier is not present on the LAN.

2. The system according to claim 1, wherein the transmission timing of the frame received from the slave station is a delay time from a moment of the frame reception to a moment at which the frame is sent to the LAN, maximum delay time being made less than a time T, where T is the time needed to communicate a smallest frame over the LAN.

3. The system according to claim 1, wherein each slave station includes:

an antenna possessing a high directivity;

a wireless unit for sending signals to and receiving signals from a master station; and a LAN controller.

4. The system according to claim 1, wherein each master station further includes:

an address table for storing addresses of slave stations under supervision; and an address-table management unit for managing said address table;

wherein when the master station has transmitted the frame received from the slave station to the LAN, the address-table management unit registers the transmitting-source address from which the frame is transmitted in said address table when said transmitting-source address has not been stored in said address table, and when a master station has received the frame from the LAN, said address-table management unit deletes said transmitting-source address from said address table when said address has been stored in said address table, and remains idle when said address has not been stored in said address table.

5. A wireless LAN system comprising a plurality of master stations connected to a LAN and slave stations wirelessly connected for sending signals to and receiving signals from the master stations, each master station sending signals to and receiving signals from the slave station by using the same channel, each master station comprising:

a wireless unit for sending signals to and receiving signals from a slave station;

a signal-strength detection unit for detecting strength of a signal received from the slave station;

a correspondence table for storing a corresponding relationship between signal strength and transmission timing, said correspondence table being set in such a manner that the higher the signal strength of a received signal, the earlier the timing at which a frame contained in the signal is transmitted to the LAN;

a transmission-timing decision unit for deciding transmission timing using the signal strength of a received signal, detected by the signal strength detection unit and said correspondence table;

a memory unit for storing a frame received from the slave station; and a control unit for discarding the frame received from the slave station if an identical frame is present on the LAN before arrival of a transmission timing provided by said transmission-timing decision unit in accordance with the strength of the signal received from the slave station, detected by the signal strength detection unit, and sending the LAN the frame received from the slave station if the identical frame is not present on the LAN at the arrival of the transmission timing.

6. The system according to claim 5, wherein each slave station includes:

an antenna possessing a high directivity;

a wireless unit for sending signals to and receiving signals from a master station; and a LAN controller.

7. The system according to claim 5, wherein the transmission timing of the frame received from the slave station is a delay time from a moment of the frame reception to a moment at which the frame is sent to the LAN, maximum delay time being made less than a time T, where T is the time needed to communicate a smallest frame over the LAN.

8. The system according to claim 6, wherein each master station further includes:

an address table for storing addressee of slave stations under supervision; and an address-table management unit for managing said address table;

wherein when the master station has sent the LAN the frame from the slave station, the address-table management unit registers the transmitting-source address from which the frame is transmitted in said address table when said transmitting-source address has not been stored in said address table, and when the master station has received the frame from the LAN, said address-table management unit deletes said transmitting-source address from said address table when said frame has been stored in said address table, and remains idle when said address has not been stored in said address table.

9. A wireless LAN system comprising a plurality of master stations connected to a LAN and slave stations wirelessly connected for sending signals to and receiving signals from the master stations, each master station sending signals to and receiving signals from the slave station by using the same channel, each master station comprising:

a wireless unit for sending signals to and receiving signals from a slave station;

a signal-strength detection unit for detecting strength of a signal received from the slave station;

a correspondence table for storing a corresponding relationship between signal strength and transmission timing, said correspondence table being set in such a manner that the higher the signal strength of a received signal, the earlier the timing at which frame contained in the signal is transmitted to the LAN;

a transmission-timing decision unit for deciding transmission timing using the signal strength of the received signal, detected by the signal strength detection unit, and said correspondence table;

a memory unit for storing a frame received from the slave station;

a comparator for comparing a frame on the LAN with the frame received from the slave station; and a control unit for discarding the frame received from the slave station if an identical frame is detected on the LAN before arrival of the transmission timing provided by said transmission timing decision unit in accordance with the strength of the signal received from the slave station, detected by the signal strength detection unit, and sending the frame received from the slave station, which has been stored in said memory unit if the identical frame is not detected on the LAN at the arrival of the transmission timing.

10. The system according to claim 9, wherein each slave station includes:

an antenna possessing a high directivity;

a wireless unit for sending signals to and receiving signals from a master station; and a LAN controller.

11. The system according to claim 9, wherein each master station further includes:

an address table for storing addresses of slave stations under supervision; and an address-table management unit for managing said address table;

wherein when the master station has sent the LAN the frame from the slave station, the address-table management unit registers the transmitting-source address from which the frame is transmitted in said address table when said transmitting-source address has not been stored in said address table, and when the master station has received the frame from the LAN, said address-table management unit deletes said transmitting-source address from said address table when said frame has been stored in said address table.

12. A master station of a wireless LAN system for transmitting signals to and receiving signals from a slave station by using the same channel, said master station comprising:

a wireless unit for sending signals to and receiving signals from the slave station;

a signal-strength detection unit for detecting strength of a signal received from the slave station;

a correspondence table for storing a corresponding relationship between signal strength and transmission timing, said correspondence table being set in such a manner that the higher the signal strength of a received signal, the earlier the timing at which frame contained in the signal is transmitted to the LAN;

a transmission-timing decision unit for deciding transmission timing using the signal strength of a received signal, detected by the signal strength detection unit, and said correspondence table;

a memory unit for storing a frame received from the slave station;

a carrier detection unit for detecting a carrier on the LAN; and a control unit for determining whether the carrier detection unit has detected a carrier on the LAN by utilizing a transmission timing provided by said transmission-timing decision unit in accordance with the strength of the signal received from the slave station, detected by the signal strength detection unit, discarding the frame received from the slave station, if the carrier is present on the LAN and transmitting the frame received from the slave station to the LAN if the carrier is not present on the LAN.

13. A master station of a wireless LAN system for transmitting signals to and receiving signals from a slave station by using the same channel, said master station comprising:

a wireless unit for sending signals to and receiving signals from the slave station;

a signal-strength detection unit for detecting strength of a signal received from the slave station;

a correspondence table for storing a corresponding relationship between signal strength and transmission timing, said correspondence table being set in such a manner that the higher the signal strength of a received signal, the earlier the timing at which frame contained in the signal is transmitted to the LAN;

a transmission-timing decision unit for deciding transmission timing using the signal strength of the received signal, detected by the signal strength detection unit and said correspondence table;

a memory unit for storing a frame received from the slave station;

a comparator for comparing a frame on the LAN with the frame received from the slave station; and a control unit for discarding the frame received from the slave station if an identical frame is detected on the LAN before the arrival of a transmission timing conforming to the strength of the signal received from the slave station, detected by the signal strength detection unit, and sending the LAN the frame from the slave station if the identical frame on the LAN is not detected at the arrival of the transmission timing.

* * * * *